United States Patent Office 3,689,446
Patented Sept. 5, 1972

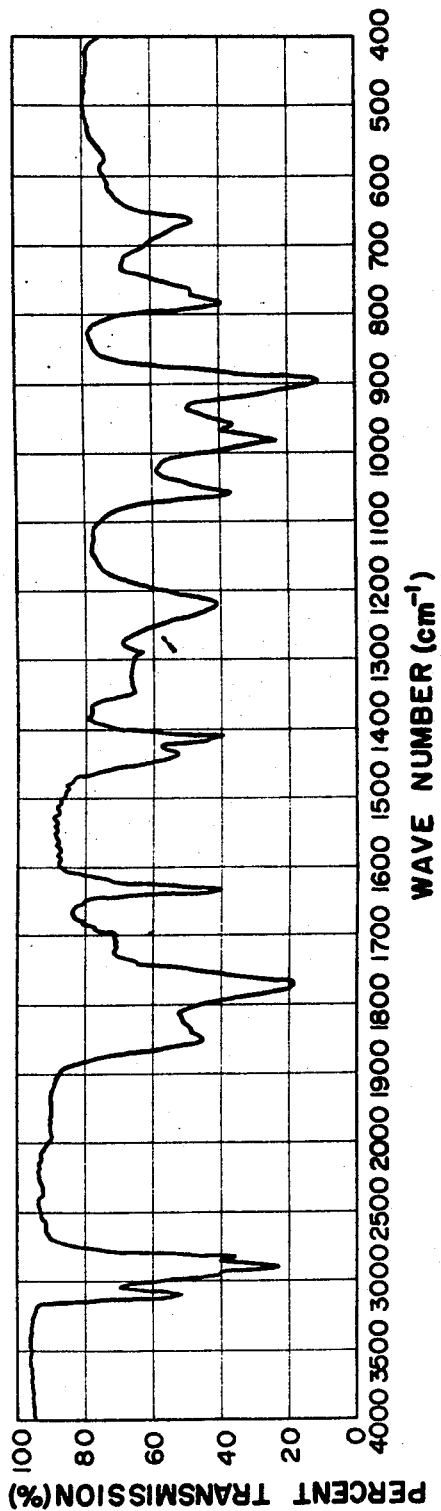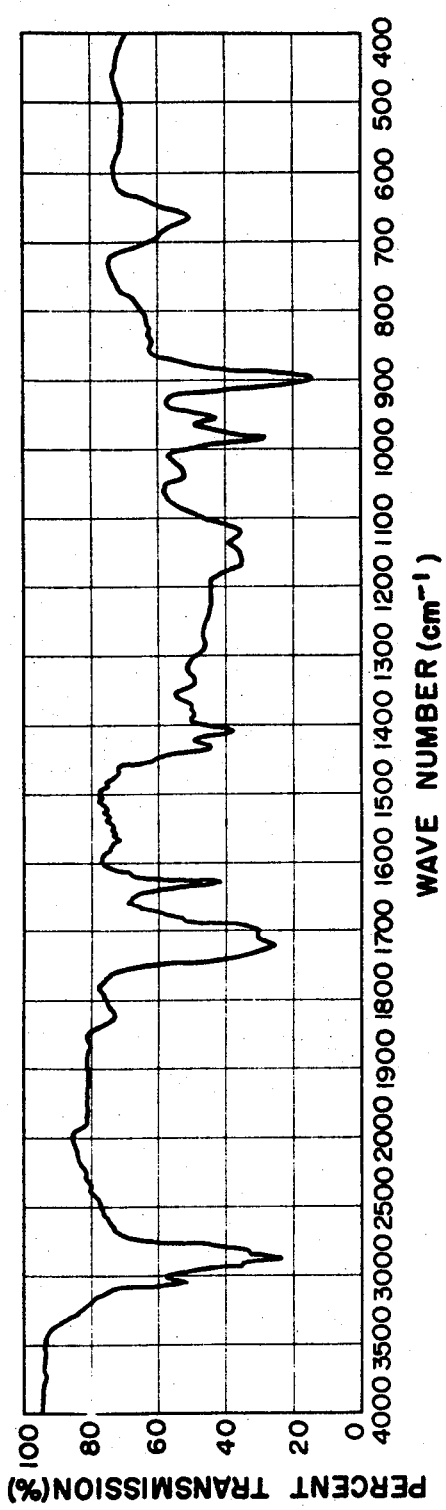

3,689,446
ELECTROPHORETIC COATING
Akio Furuya and Masaaki Hayashi, Yokohama-shi, Kouichi Nagami, Kawasaki-shi, Masakatsu Uchida, Kamakura-shi, Sakae Nishino and Toshikatsu Asada, Yokohama-shi, Yasuo Nagao, Kamakura-shi, Hiroyoshi Matsuda, Moriguchi-shi, and Harufumi Tsuchiya, Ibaragi-shi, Japan, assignors to Dai Nippon Toryo Kabushiki Kaisha, Konohana-ku, Osaka, Japan
Filed Dec. 8, 1969, Ser. No. 882,822
Claims priority, application Japan, Dec. 9, 1968, 43/90,053
Int. Cl. C23b 13/00
U.S. Cl. 260—23.7 R
6 Claims

ABSTRACT OF THE DISCLOSURE

An electrophoretic coating composition comprising a polybutadiene water-soluble resin prepared by esterifying an adduct of butadiene polymer containing 70% or more of 1,2-bonding and maleic anhydride, the addition degree of maleic anhydride being 5–20 weight percent, with an esterifying agent having at least one primary or secondary alcoholic hydroxyl group in its molecule to an esterification degree of 10–50% provides a coating having an excellent appearance, and which is free of water-mark when applied by electrodeposition.

---

Figure 3:
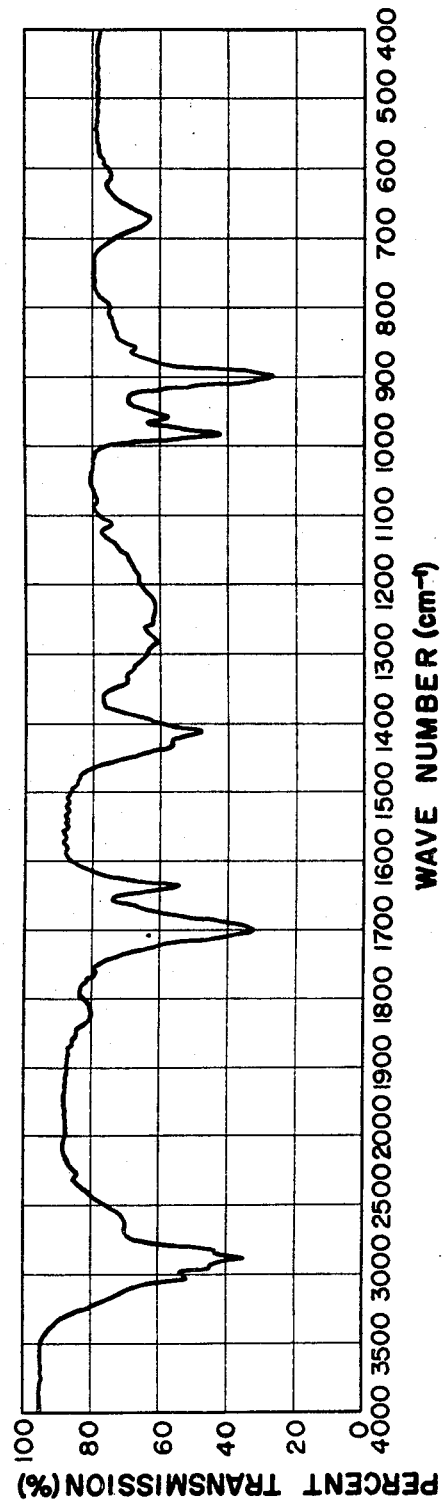

The present invention relates to electrophoretic coating compositions. When the coating composition of the present invention is applied by electrodeposition, the resulting film has a remarkably better appearance than in the case of conventional coating compositions, and moreover has hardly any water-mark.

As a method for obtaining a uniformly coated film, an electrophoretic coating method was conventionally and widely employed. In the coating method, water-soluble resin coatings or emulsion coatings prepared from drying oils, alkyd resins, amino resins, phenolic resins, acrylic resins, or epoxy ester resins, are used. For instance, Allan E. Gilchrist's U.S. Patent No. 3,230,162 (Jan. 18, 1966) is exemplary.

Recently, there is a method which comprises forming an adduct by heat-treating a butadiene polymer having polybutadiene chain structure such as polybutadiene or a butadiene-styrene compolymer which is prepared by an anionic polymerization with an alkali metal catalyst, and an ethylenically $\alpha,\beta$-dicarboxyl compound and using the resulting product as a coating resin.

For example, according to U.S. Patent No. 3,457,207 (Patented July 22, 1969) by Klaus Jorke et al. a raw material prepared by adding maleic anhydride to polybutadiene having 50% or more cis-1,4-double bonds may be used as one raw material for quick-drying alkyd resin. All of these materials are solvent type coating materials, which are quite different in quality from the composition of the present invention and therefore cannot be used for such objects as in the present invention.

Moreover, a coating material employing maleinized polybutadiene is also well known. For example, according to Shell International Research Maatschappij N.V.'s British Patent No. 970,333 (published Sept. 23, 1964), a product prepared by reacting a cyclic unsaturated acid anhydride with a diolefin polymer having 25% or more of 1,4-bonding is used as a coating resin. It is a solvent type coating material and different from the composition of the present invention. If the above-mentioned resin is neutralized with ammonia or an organic amine to form a water-soluble resin and is applied for electrophoretic coating, the electrodeposition property of the resin is far inferior to that of the present invention, and the properties of the resulting film are inferior to those of the composition of the present invention. (Refer to the comparative example given below.) On the other hand, water-soluble coating materials employing polybutadiene are partially known. For example, there is United States Patent No. 3,365,411 by Joseph K. Mertzweiller et al. (patented Jan. 23, 1968). The said patent provides a water-soluble coating composition comprising a mixture of (A) the reaction product of an unsaturated polycarboxylic acid anhydride with a homopolymer or copolymer of 1,4-polybutadiene and (B) the reaction product of partial ester of polycarboxylic acid or anhydride with 1,4-polybutadiene. The effect of the composition of the said Patent No. 3,365,411 is remarkably different in electrodeposition property from that of the present invention in which 1,2-polybutadiene is the main substance and moreover half esterification is essentially required after addition of maleic acid or anhydride. The effect of the present invention is attained as a result of the difference of the structure of the polybutadiene used and the esterification after addition of maleic anhydride. A resin having excellent electrodeposition properties can never be prepared from conventionally known products mainly consisting of 1,4-bonding. Differences in the effects between the two will be evident from the comparative examples given below. Namely, the coated film of polybutadiene of 1,4-bonding is very slowly cured, and moreover curing is effected from the film surface. Therefore, the internal portion of the coated film is not sufficiently cured and the hardness of the film is remarkably lower. The polybutadiene of 1,4-bonding therefore cannot be utilized for such objects as in the present invention.

Under the circumstances, good results in appearance and physical properties of a film which is electrodeposited in an aqueous solution of neutralized maleic anhydride adduct of 1,2-polybutadiene cannot be attained always compared with the results in the case of using a conventional water-soluble resin. Especially, in the case when the said matter is applied for electrophoretic coating on non-ferrous metals (namely, brass, copper, zinc-plated panels, aluminum, aluminum alloy, etc.), the curing rate of the coated film is quite slow and therefore the said polymer is not practical.

An object of the present invention is to improve the appearance of the coated film prepared by electrophoretic coating, namely rough touch, pin-hole, edge covering and unevenness of thick films.

Another object is to improve the physical and chemical properties of the electrophoretic control film. Another object is to prevent re-solubility of the coated film in the electrophoretic coating bath.

The present invention relates to a composition for electrodeposition comprising a water-soluble polybutadiene prepared by adding butadiene polymers having a number average molecular weight of 500–7000, preferably 1000–5000 and containing 70% or more, preferably 80 or more of 1,2-bonding, or a mixture of more than one such butadiene polymer and maleic anhydride (addition degree: 5–20 weight percent, preferably 7.5–15 weight percent), and then esterifying the addition products with an esterifying agent having at least one primary or secondary alcoholic hydroxy group in its molecule to an esterification degree of 10–50%. Moreover, the invention relates to an electrophoretic coating composition comprising a mixture of 5–95 weight percent, preferably 50–95 weight percent of the above-mentioned water-soluble polybutadiene and 95–5 weight percent, preferably 50–5 weight percent of at least one water-soluble or water-dispersible resin capable of being compatible with said water-soluble polybutadiene.

The above-mentioned water-soluble or water-dispersible resins having an acid value of 20 or more include acrylic resins, alkyd resins, epoxy ester resins, phenolic resins, ethylenically α,β-unsaturated dibasic acid adducts of drying oils and their half esters, or water-soluble amino resins or derivatives thereof, for example, a methylolated derivative, or derivatives of water-soluble phenolic resins, for example methylolated derivatives, etc.

The present invention includes an electrophoretic coating composition comprising a water-soluble polybutadiene alone prepared by bubbling air or oxygen through a melted butadiene polymer or a mixture thereof at 80–160° C., thereafter adding maleic anhydride to the resulting product and esterifying the resulting adduct with the said esterifying agent, or by bubbling air or oxygen through the polybutadiene subject to the addition of maleic anhydride and the esterification at a temperature of 80–160° C., or a mixture of said water-soluble polybutadiene and at least one water-soluble or water-dispersible resins mentioned above at the ratio of 5–95:95–5 weight percent, preferably 50–95:5–50 weight percent.

Furthermore, the present invention also includes electrophoretic coating compositions comprising half esterified material alone prepared by adding maleic anhydride to butadiene polymers having a number average molecular weight of 500–7000, preferably 1000–5000 and containing 70% or more, of preferably 80% or more, 1,2-bonding or a mixture thereof to form a reaction product, adding 5–95 weight percent, preferably 30–90 weight percent, of the reaction product to 95–5 weight percent, preferably 70–10 weight percent, of a reaction product prepared from drying oils and ethylenically α,β-unsaturated dibasic acids at a temperature of 70–130° C. under an atmosphere of nitrogen, and subjecting the said mixture to simultaneous half esterification with the above-mentioned esterifying agent, or comprising a composition prepared by mixing the above-mentioned at least one water-soluble or water-dispersible resin with the half esterified material in a ratio of 70–95:30–5 weight percent, preferably 80–95:20–5 weight percent.

The butadiene polymers of the present invention include butadiene homopolymer or substances having an electron-acceptor such as a carboxyl group or a hydroxyl group at one or both ends of the butadiene polymer molecular chain.

The molecular weight of such butadiene polymer as mentioned above is 500–7000, preferably 1000–5000 of a number average molecular weight, judging from solubility in water, electrodeposition performance and the properties of the coated film.

When a higher molecular weight polybutadiene is used, the physical properties and chemical resistance of the coated film are improved, but the water-solubility of the polymer is poor and the viscosity of an aqueous solution thereof is high. Moreover, gelation is easily caused in the addition reaction of maleic anhydride. When a lower molecular weight polybutadiene is used, the physical and chemical properties of the coated film are poor. Therefore, the above-mentioned range is most appropriate. Moreover, it is necessary that 1,2-bonding of butadiene units in the polymer chain be not less than 70%, preferably 80% or more. In case of butadiene homopolymer having 70% or less 1,2-bonding, curing of the surface of the coated film occurs but the curing rate of the internal portion of the film is extremely slow. Therefore the said polymer is not suitable for a protective coating. Accordingly, this point is the most important characteristic of the present invention. Generally, 5–20 weight percent preferably 7.5–15 weight percent, of maleic anhydride is added to the above-mentioned butadiene polymer. This addition degree is a limitation defined by the solubility of the polymer in water and the adhesion of the coated film to substrate alkali-resistance of the coated film, etc. The addition degree within the above-mentioned range can be varied according to the amount of maleic anhydride, the reaction temperature and the reaction time.

The reaction temperature is usually 120–250° C. At a temperature of 120° C. or below, the reaction velocity is slow, and at such a comparatively high temperature as 250° C. or above, the reaction product is easily gelled. In order to prevent gelation, it is desirable to carry out the reaction under an inert atmosphere such as nitrogen, carbon dioxide gas, etc. As a gelling inhibitor, 0.01–2 weight percent, based on the butadiene polymer, of an antioxidant such as 2,6-di-tert-butyl-p-cresol may be used.

A diluent or solvent which has a boiling point of 120° C. or above, the addition reaction temperature, and is inert to butadiene polymer or maleic anhydride may be employed for the purpose of reducing the viscosity and carrying out the reaction uniformly. In general, solvents of the aliphatic hydrocarbon type such as mineral spirit, aromatic hydrocarbons, such as toluene, xylene, etc., or chlorinated hydrocarbons such as ortho-dichlorobenzene are suitable.

After the reaction, the unreacted maleic anhydride and diluent are removed under a reduced pressure, to obtain a colorless or pale yellowish viscous reaction product.

The said reaction product is added with the following esterifying agent, heated and dissolved, and simultaneously half esterified. The esterification degree is required to be 10–50%. In the present invention it is an essential condition for improving the compatibility with other water-dispersible resins to subject the above-mentioned adduct of butadiene polymer and maleic anhydride to half esterification.

Another important characteristic is that an electrodeposited film of the half esterified product is too smooth and excellent in its appearance to attain them from conventionally known compositions. Maleinized polybutadiene which is not half esterified or has an esterification degree of 10% or less is inferior in compatibility with other resins and moreover the smoothness of the coated film by electrodeposition is quite inferior. It is difficult to attain a high degree of esterification only by dissolving the maleinized polybutadiene in an esterifying agent at room temperature. It is necessary for esterification to heat at 80° C. for one or more hours. When water or a neutralizing agent is added before the esterifying agent is added to maleinized polybutadiene, the half esterification reaction is obstructed and maleinized polybutadiene having the expected high degree of esterification cannot be obtained.

The esterifying agents to be used in the present invention have at least one primary or secondary alcoholic hydroxyl group in their molecules. The said esterifying agents include glycol ethers, monovalent primary or secondary aliphatic-, aromatic- or heterocyclic-alcohols containing 18 or less carbon atoms, asymmetrical glycols having 3–10 carbon atoms, and aliphatic carboxylic acids containing 18 or less carbon atoms or ester thereof having an average of one hydroxyl group in the molecule.

Examples of the esterifying agents to be used are mentioned below; i.e.

Glycol ethers such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monoisopropyl ether, diethylene glycol monobutyl ether, etc.;

Monovalent primary alcohols such as methyl alcohol, ethyl alcohol, propyl alcohol, butyl alcohol, n-hexyl alcohol, lauryl alcohol, decyl alcohol, dodecyl alcohol, stearyl alcohol, benzyl alcohol, etc.;

Monovalent secondary alcohol such as isopropyl alcohol, secondary butyl alcohol, hexanol-2, hexanol-3, cyclohexanol, capryl alcohol, etc.;

Monovalent alcohols having a cyclic ether structure such as tetrahydrofurfuryl alcohol, tetrahydropyrane-2-methanol, etc.;

Aliphatic carboxylic acids, for example ricinoleic acid and its ester having an average of one hydroxyl group in the molecule, for example partially dehydrated castor oil;

Asymmetrical glycols having primary and secondary hydroxyl groups in the molecule such as propylene glycol, 1,2-butanediol, 1,3-butanediol, 2,2,4-trimethyl-1,3-pentadiol, 1-phenyl-1,2-ethanediol, etc.

These esterifying agents affect the physical properties of the coated film by electrodeposition. In the case when glycol ethers having 10–18 carbon atoms, monovalent, primary or secondary alcohols having 10–18 carbon atoms and a chain structure and aliphatic carboxylic acid or its esters having an average of one hydroxyl group in the molecule are used as esterifying agents, adhesion and flexibility of the film coated by electrodeposition is excellent. In the case when esterifying agents having aromatic rings or heterocyclic rings in the molecule are used, the hardness of the film coated by electrodeposition is excellent, but the other properties thereof are intermediate.

In order to further improve the appearance of the film coated by electrodeposition, the throwing power in electrodeposition coating and compatibility with other resins, maleic anhydride is added to the above-mentioned butadiene polymer and then esterified with the above-mentioned esterifying agents to form a reaction product, followed by heating at a temperature of 80–160° C., preferably 100–150° C., with bubbling air or oxygen, whereby very good results can be attained. The desired effect can be sufficiently attained even by employing only the reaction product prepared by heat treating with bubbling air or oxygen as mentioned above as an electrophoretic coating composition, but when employing a mixture of the said reaction product with such other water-soluble or water-dispersible resin as stated above, even better results can be attained. When the heating is too high, or the reaction period is too long, in such heating with blowing air or oxygen as stated above, the appearance of the film coated by electrodeposition is poor and the desired effect cannot be naturally attained at a too low temperature. Accordingly, it is desirable that the treatment temperature be 80–160° C., preferably 100–150° C. The reaction period is 0.5–7 hours, preferably 1–4 hours. Conventional electrodeposited films from compositions which are not subjected to said treatment have a tendency to cause a sag in baking, and moreover water marks are easily formed on the surface of the coated film. Further, the throwing power in electrodeposition is 70% or less. The throwing power is improved to 85% or more by subjecting the composition of the present invention to the above-mentioned treatment. In order to further improve the throwing power it is desirable to effect the above-mentioned treatment, even though the compositions of the present invention provide smooth films with excellent physical properties and give no water marks.

Then, the other water-soluble or water-dispersible resins to be used in the present invention must have compatibility with the half ester of maleinized polybutadiene. Compatibility as used herein means that the electrodeposition coating composition prepared by mixing the half ester of maleinized polybutadiene with the water-soluble or water-dispersible resins at said weight ratio is neither viscous nor separated, and moreover the coated film after baking has no haze. Therefore, even if the solution is hazy after mixing said two components, it is not objectionable unless the solution is viscous and separated and if the coated film after baking is transparent.

The method comprises mixing the half ester of maleinized polybutadiene and the said water-soluble or water-dispersible resin into organic amine or ammonium salt, respectively, and mixing the substances, or comprises neutralizing said two substances after first mixing them. In view of the difficulty of the mixing treatment, the latter method is desirable.

Water-soluble polybutadiene resins of the present invention can be used in the form of a mixture with various water-soluble or water-dispersible resins, as stated above. Particularly, when using the reaction product of a drying oil and an ethylenic $\alpha,\beta$-unsaturated dibasic acid, the said maleinized polybutadiene is mixed with the reaction product of a drying oil and ethylenic $\alpha,\beta$-unsaturated dibasic acid, and then added with said esterifying agent to effect esterification. The resulting coating composition can form a film having excellent appearance and chemical resistance.

The blending ratio of the half ester of said product in the maleinized polybutadiene to the said water-soluble or water-dispersible resin is 5–95:95–5 weight percent, preferably 5–95:50–5 weight percent, based on the non-volatile matter in the resin. With so much of an increase of the amount of the latter substance, the original excellent characteristics of the water-soluble polybutadiene composition are not attained sufficiently, and therefore the hardness, smoothness, chemical resistance and corrosion resistance of the surface of the coated film and throwing power are reduced.

The thus prepared reaction product is neutralized with ammonia, morpholin, an alkylamine such as monoethylamine, diethylamine, triethylamine, etc., an alkanol amine such as ethanol amine, or an inorganic alkali such as caustic potash. In general, diethyl amine, triethyl amine or a mixture thereof with an alkanol amine is appropriately used.

In order to accelerate hardening of the coated film, it is effective to add 0.01–0.5 weight percent as metal based on the non-volatile matter of the octoate or naphthenate of cobalt, iron, zironium, calcium, strontium, zinc, or tin, but lead and manganese are not desirable.

On the other hand, the coating materials are prepared by dispersing pigments such as titanium dioxide, carbon black, iron oxide, etc. Anti-corrosive pigments such as strontium chromate, basic lead silicochromate, etc. and extenders such as talc and kaolin also may be used.

A coated film by electrodeposition prepared by neutralized water-soluble and/or water-dispersible composition with said amine or ammonia at a pH value within the range of 7.5–7, diluting with water to 5–20 weight percent non-volatile matter, immersing the substrate as an anode in the said aqueous solution, impressing 80–250 volts of direct current for 1–5 minutes gives a very uniform film by baking under the definite conditions after washing the anode with water.

That is, the above-mentioned film had no rough touch and pin holes, and was far superior to conventional coated films. For example, when a conventional water-soluble alkyd resin is used for such object as in the present invention, the coated film is uneven and has extremely poor appearance and inferior chemical resistances (alkali resistance, acid resistance etc.) as compared with those in the present invention. When a water-soluble resin prepared from the adduct of polybutadiene polymer and ethylenic $\alpha,\beta$-unsaturated dibasic acid is used in the other method, the physical properties of the coated film are reduced, and moreover in the case of coating on brass or copper, the coated film is not sufficiently cured, which are disadvantages. However, when employing the composition of the present invention, the above-mentioned disadvantages are almost eliminated. Formation of watermarks on the film coated by electrodeposition, which is the greatest characteristic of the present invention can never be eliminated by the use of conventional coating materials from water-soluble resins and/or water-dispersible resins. The method for judging whether water-marks are formed or not is described below. The coated film, after electrode-position is rinsed with water, dried in air for a little while until water is removed from the surface of the coated film, dropped with about 0.5 ml. of distilled water by a pipette, and dried forcedly under a definite temperature. When apparent hollow portions are formed by the said drop of water, it is said that water-marks are formed on the coated film.

When a finishing enamel is topcoated on an electrodeposited film having such water-marks as mentioned, a uniform finished coating cannot be obtained. Therefore, a water-marked film is generally sanded before topcoating to eliminate the problem. Such drawbacks are all removed by the use of the composition of the present invention.

The following examples illustrate specific embodiments of the present invention. All quantities described in this specification and the appended claims as "parts" or "percent" refer to "parts by weight" or "percent of weight" unless expressly stated otherwise.

EXAMPLE 1

One hundred parts of butadiene polymer having a number average molecular weight of 1910, 91.2% 1,2-bonding, 8.8% 1,4-trans bonding, and a viscosity of 74 poises at 45° C. were dissolved in 100 parts of o-dichlorobenzene. 45 parts of maleic anhydride and 0.2 part of 2,6-ditert-butyl-p-cresol were added to the resulting solution and reacted at 160° C. for 7 hours in a nitrogen atmospheric vessel with stirring.

Unreacted maleic anhydride and o-dichlorobenzene, the reaction solvent, were distilled off under reduced pressure, resulting in a pale brown, viscous polymer. The acid value of the polymer was 130 and the addition degree of maleic anhydride based on the weight of the polymer was 11.4%.

To 100 parts of the said polymer, 30 parts of ethylene glycol monoethyl ether were added and heated to 130° C. with stirring. The infrared absorption spectrum of the polymer at the early stage of the reaction is shown in FIG. 1 and that of the polymer reacted with ethylene glycol monoethyl ether at 130° C. for 2 hours is shown in FIG. 2. Significant differences are observed between the two spectra. That is, absorption due to the acid anhydride ring at 1790 cm.$^{-1}$ disappears by said heating and new absorption bands showing ester and carboxyl groups at 1720 cm.$^{-1}$ and 1700 cm.$^{-1}$, respectively appear. The acid value of the polymer decreased to 57. These facts indicate the formation of a half ester. The esterification degree based on acid content of the polymer was about 50%.

The reaction product was neutralized with 0.7 equivalent of triethyl amine and added with 20 parts of tert-butanol to dilute.

Then, the composition was diluted with deionized water to 10% non-volatile matter. The pH value of the solution was 8.4. A film having a thickness of 25μ was electrodeposited by applying 200 volts for 2 minutes on a zinc phosphate treated steel panel from the solution at 25° C. with slow stirring. The electrodeposited film was baked at 150° C. for 30 minutes. The throwing power thereof was 70%. The baked film had excellent flowing property appearance, and was quite smooth. But the edge covering was poor. The pencil hardness of the film was 3H. The results of the Erichsen test and impact test were 6.5 mm. and 40 cm. pass, respectively. As the results of an alkali resistance test (0.5% caustic soda at 20° C., 24 hours) and an acid resistance test (5% sulfuric acid at 20° C., 48 hours), the baked film was not affected by these chemicals at all. As the result of a salt spray test for 150 hours, the rust creep from scratch was 0.5 mm. and the loss of adhesion from scratch was 1 mm., which were excellent.

TABLE 1

| Example | 2 | 3 | 4 | 5 | 6 | 7 | 8 | 9 | 10 | 11 |
|---|---|---|---|---|---|---|---|---|---|---|
| Composition and nature of butadiene polymer: | | | | | | | | | | |
| Number average molecular weight | 3,070 | 4,020 | 2,180 | 2,355 | 4,010 | 3,070 | 3,070 | 3,070 | 1,910 | 3,070 |
| 1,2-bond, percent | 91.1 | 93.0 | 76.0 | 90.9 | 88.0 | 91.1 | 91.1 | 91.1 | 91.2 | 91.1 |
| 1,4-trans bond, percent | 8.9 | 7.0 | 24.0 | 9.1 | 12.0 | 8.9 | 8.9 | 8.9 | 8.8 | 8.9 |
| 1,4-cis bond, percent | | | | | | | | | | |
| Others | | | | Carbocyl [1] | Hydroxyl [2] | | | | | |
| Viscosity, poise (at 45° C.) | 260 | 1,310 | 290 | 392 | 1,310 | 260 | 260 | 260 | 74 | 260 |
| Maleinization: | | | | | | | | | | |
| Amount of butadiene polymer, parts by wt. | 100 | 100 | 100 | 100 | 100 | 100 | 100 | 100 | 100 | 100 |
| Amount of maleic anhydride, parts by wt. | 45 | 50 | 45 | 30 | 45 | 45 | 45 | 45 | 45 | 45 |
| Kind of solvent | DCB | Solveso #150 | DCB | Solveso #100 | DCB | DCB | DCB | DCB | DCB | DCB |
| Amount of solvent, parts by wt. | 100 | 100 | 100 | 100 | 100 | 100 | 100 | 100 | 100 | 100 |
| Kind of anti-oxidant | BHT | BHT | BHT | BHT | BHT | BHT | BHT | BHT | BHT | BHT |
| Amount of anti-oxidant, parts by wt. | 0.2 | 0.5 | 0.5 | 0.5 | 1.0 | 0.2 | 0.2 | 0.2 | 0.2 | 0.2 |
| Reaction temperature, °C | 160 | 175 | 160 | 160 | 160 | 160 | 160 | 160 | 160 | 160 |
| Reaction period, hours | 7.5 | 5.0 | 6.5 | 6.0 | 5.0 | 7.5 | 7.5 | 7.5 | 7.0 | 7.5 |
| Addition degree of maleic anhydride on the weight of the polymer, percent | 13.0 | 12.0 | 16.5 | 7.5 | 8.3 | 13.0 | 13.0 | 13.0 | 11.4 | 13.0 |
| Acid value, mg. KOH/g. | 148 | 137 | 188 | 118 | 94 | 148 | 148 | 148 | 130 | 148 |
| Esterification: | | | | | | | | | | |
| Kind of esterifying agent | EC | BC | EC | n-Butanol | n-Octanol | Stearyl alcohol | Cyclohexanol | Tetrahydrofurfuryl alcohol | Partially dehydrated castor oil | Propylene glycol |
| Amount of esterifying agent, parts by wt. | 30 | 30 | 50 | 20 | 15 | 25 | 17 | 13.5 | 25 | 45 |
| Reaction temperature, °C | 130 | 130 | 130 | 110 | 130 | 140 | 130 | 120 | 130 | 120 |
| Reaction time, hours | 2 | 4 | 2 | 2 | 2 | 2 | 2 | 3 | 4 | 5 |
| Esterification degree based on acid content of the polymer, percent | 50 | 27 | 48 | 41.5 | 46 | 30 | 50 | 44 | 10 | 60 |
| Acid value, mg. KOH/g. | 63 | 98 | 93 | 70 | 45 | 86 | 66 | 70 | 99 | 68 |
| Neutralization: | | | | | | | | | | |
| Kind of neutralizing agent | DEA | TEA | DEA | TEA | DEA | TEA | TEA | TEA | TEA | TEA |
| Amount of neutralizing agent, equivalent | 0.7 | 0.7 | 0.7 | 0.7 | 0.7 | 0.7 | 0.7 | 0.7 | 0.7 | 0.7 |
| Dilution: | | | | | | | | | | |
| Kind of diluent | Tert-butanol | Tert-butanol | EC | EC | EC | EC | EC | EC | EC | BC |
| Amount of diluent, parts by wt. | 20 | 20 | 30 | 30 | 35 | 50 | 50 | 50 | 50 | 50 |

[1] Acid value 33.6. [2] Hydroxyl value 21.1.

NOTE.—DCB=o-Dichlorobenzene; BHT=2,6-di-tert-butyl-p-cresol; EC=Ethylene glycol monoethyl ether; BC=Ethylene glycol monobutyl ether; DEA=Diethyl amine; TEA=Triethyl amine.

EXAMPLES 2-11

Butadiene polymers having 1,2-bonding as the main structure were maleinized followed by half esterification and neutralization under such condition as shown in the table.

The compositions prepared in Examples 2-11 were diluted with deionized water to 10% non-volatile matter, respectively. From the resulting compositions electrodeposition was carried out on zinc phosphate treated steel panels using the same procedure as described in Example 1. Films having a thickness of $25\mu$ were electrodeposited by applying 150-220 volts for 2 minutes. The throwing power thereof was 65-70%.

The physical and chemical properties of the electrodeposited films in Examples 2-11 were closely similar to those of the coated film in Example 1, which were excellent. Moreover, the appearance of the coated films was excellent, the said films being smooth. However, the coated film prepared in Example 4 was slightly inferior to those of the other examples with respect to appearance and flexibility.

EXAMPLE 12

Fourteen parts of maleic anhydride were added to 86 parts of linseed oil and reacted at 220° C. for 10 hours in a nitrogen atmospheric vessel with stirring, resulting in a maleinized linseed oil. The maleinized linseed oil was esterified with 30 parts of ethylene glycol monoethyl ether at 130° C. for 2 hours, to obtain a solution of 77% non-volatile matter. The acid value of the half esterified material was 64. The half esterified material was neutralized with 0.9 equivalent of diethylamine.

Then, the neutralized maleinized linseed oil was mixed with a neutralized maleinized polybutadiene of Example 2 in the 60/40 solid ratio based on the solids.

A coating material comprising the following formulation was prepared.

| | Wt. percent |
|---|---|
| Resin solids | 80.0 |
| Titanium dioxide | 18.6 |
| Carbon black | 0.8 |
| Strontium chromate | 0.6 |
| | 100.0 |

This coating material was diluted with deionized water to 12% non-volatile matter. The pH value of the electrodeposition paint bath was 8.3. Electrodeposition was carried out from the bath on zinc phosphate treated steel, galvanized steel, aluminum, brass and tin plated panels with slow stirring at a bath temperature of 25° C. The resulting electrodeposited films were rinsed with water and baked at 160° C. for 30 minutes. Films having thicknesses of about $25\mu$ were electrodeposited on zinc phosphate treated steel panels at 140 volts for 2 minutes. The throwing power was 65%. The baked film was smooth and the appearance thereof was excellent, water-mark was not formed. Moreover, the edge covering was good. The pencil hardness was H and the results of the Erichsen test and the impact test were 8 mm. and 50 cm. pass, respectively. As the results of alkali and acid resistance tests as in Example 1, it was found that the coated films were not affected by these chemicals. As the result of salt spray test for 240 hours, the rust creep from scratch was 0.5 mm. and the loss of adhesion from scratch was 1 mm., which were excellent.

When alkyd-melamine enamels were topcoated on the electrodeposited films and baked at 130° C. for 20 minutes, the finished coatings had excellent appearance and gloss value of 90 or more.

The appearance of films electrodeposited on galvanized steel, aluminum, brass, and tin-plated-panels were excellent. The pencil hardness of the film on the brass panel was F and those of the other panels were H.

EXAMPLE 13

Sixty parts of the maleinized polybutadiene as described in Example 2 and 40 parts of the maleinized linseed oil as described in Example 12 were dissolved in 30 parts of ethylene glycol monoethyl ether and the resulting mixture was heated to achieve half esterification at 130° C. for 2 hours. The acid value of the half esterified material was 70. The resulting material was neutralized with 0.8 equivalent of diethyl amine and a coating material was prepared according to the same formulation as described in Example 12. The coating material was diluted with deionized water to 12% non-volatile matter. The pH value of the diluted coating material was 8.3.

Electrodeposition was carried out by the same method as in Example 1 and baked. The results of test of the films were very similar to those in Example 12.

EXAMPLE 14

Two hundred and forty two parts of coconut oil fatty acids and 424 parts of neopentyl glycol were heated at 180° C. for 1 hour with stirring in a nitrogen atmospheric vessel. 85 parts of adipic acid and 336 parts of trimellitic anhydride were added thereto, and heated continuously at 180-190° C. for 6.5 hours. The acid value of the reaction product was 55. Then, 250 parts of tert-butanol were added to the product, resulting in a solution of 80% non-volatile matter. The solution was neutralized with 0.9 equivalent of diethyl amine.

The neutralized, maleinized polybutadiene of Example 3, the above-mentioned water-soluble alkyd resin and hexakis (methoxymethyl) melamine were mixed in a 60/32/8 ratio based on the solids to prepare a coating material in the same formulation as described in Example 12.

The coating material was diluted with deionized water to 12% non-volatile matter. The pH value of the coating material was 8.2.

Electrodeposition was carried out by the same method as in Example 1. A film having a thickness of about $25\mu$ was prepared by electrodeposition at 150 volts for 2 minutes, and the throwing power was 70%. The film baked at 160° C. for 30 minutes was excellent and no watermark was formed. The pencil hardness was 2H and that of the film on a brass panel was HB. Other properties were excellent as in Example 12.

EXAMPLE 15

Two hundred and eighty six parts of 4,4-bis(4-hydroxylphenyl)pentanoic acid and pentaerythritol were heated at 200° C. for 6 hours in a nitrogen atmospheric vessel with stirring. Then, 324 parts of 37% formaline, 2.8 parts of sodium hydroxide, 230 parts of water and 100 parts of ethylene glycol monoethyl ether were added thereto. The mixture was heated at a reflux temperature for 7 hours with stirring, thereafter cooled and filtered off. The non-volatile matter of the filtrate was 45%. After mixing the neutralized polybutadiene prepared as in Example 5 and said phenolic resin at a resin solid fraction ratio of 80:20, the pigments described in Example 12 were dispersed to form a coating material.

The coating material was diluted with deionized water to 12% non-volatile matter. The pH value of the diluted coating material was 8.3.

Electrodeposition was carried out by the same method as in Example 1. A film having thickness of about $25\mu$ was electrodeposited by applying 200 volts for 2 minutes. The throwing power was 70%. The resulting film was baked at 180° C. for 30 minutes. At a baking temperature of 170° C. or below, sufficient curing was not completed. The cured film discolored, but was very smooth. The appearance thereof was excellent. The pencil hardness was 3H. The result of Erichsen test was 5.5 mm. The film was not affected in an alkali resistance test for 48 hours. The result of salt spray test for 240 hours was 0.5 mm. loss of adhesion from scratch. The pencil hardness of the electrodeposited film on a brass panel was B.

EXAMPLE 16

Twenty parts of methyl methacrylate, 60 parts of 2-ethylhexyl acrylate, 10 parts of 2-hydroxyethyl methacrylate, 10 parts of acrylic acid, 30 parts of ethylene glycol monoethyl ether, 30 parts of ethylene glycol monobutyl ether and 1 part of 2,2'-azobisisobutyronitrile were mixed to polymerize same at 90° C. for 10 hours with stirring, resulting in an acrylic polymer solution of 62% non-volatile matter. The acid value of the polymer was 73. The solution was neutralized with 0.7 equivalent of triethyl amine.

Then, the neutralized, maleinized polybutadiene prepared as in Example 1, the said acrylic resin and hexakis (methoxymethyl) melamine were mixed in a 70/25/5 ratio, and thereafter a coating material was prepared by dispersing such pigments as shown in Example 12 in the mixture. The coating material was diluted with deionized water to 12% non-volatile matter. The pH value of the coating material was 8.0.

Electrodeposition was carried out by the same method as in Example 1. A film having thickness of about $25\mu$ was electrodeposited by applying 150 volts for 2 minutes. The throwing power was 65%. The appearance of the coated film baked at 150° C. for 30 minutes was excellent. The pencil hardness was F–H. Other properties were similar to the results in Example 14.

EXAMPLE 17

A coating material was prepared using the neutralized maleinized polybutadiene of Example 4 in the same formulation as described in Example 12.

The pH value of the diluted coating material was 8.0. A film having thickness of about $25\mu$ was electrodeposited by applying 150 volts for 2 minutes. The film was slightly inferior in smoothness. The result of impact test was 40 cm. and Erichsen test result was 5 mm. Physical properties of the over-baked films were greatly lowered in comparison with those in Example 12.

EXAMPLE 18

A coating material was prepared using the neutralized maleinized polybutadiene of Example 6 in the same formulation as described in Example 14.

The pH value of the diluted coating material was 8.5. The result of the tests for the coating material were very similar to the results in Example 14.

EXAMPLE 19

A coating composition was prepared from a combination of the neutralized maleinized polybutadiene with hexakis (methoxymethyl) melamine in a 100/20 ratio.

The pH value of the diluted coating material was 8.0. The throwing power thereof was 70%. A film having a thickness of about $25\mu$ was electrodeposited by applying 180 volts for 2 minutes. The appearance of the coated film after baking at 150° C. for 30 minutes was good and no water-mark was formed. The pencil hardness was 3H. Other properties were closely similar to those in Example 12. Especially, the curing property of the film on a brass panel was excellent and a pencil hardness of H–2H was attained. Moreover, when an alkyd-melamine enamel was top-coated on the electrodeposited film and baked at 130° C. for 20 minutes, the finished surface had particularly excellent appearance and smoothness and gloss value of 95 or more.

EXAMPLE 20

One hundred parts of butadiene polymer having a number average molecular weight of 1910, and 91.2% of 1,2-bonding and 8.8% 1,4-trans bonding, a viscosity of 74 poises at 45° C. were heated at 100° C. for 1.5 hours with air bubbling. 100 parts of o-dichlorobenzene and 45 parts of maleic anhydride and 1 part of 2,6-di-tert-butyl-p-cresol were added thereto and reacted at 160° C. for 5 hours in a nitrogen atmospheric vessel.

O-dichlorobenzene and non-reacted maleic anhydride were distilled off under reduced pressure to leave a brownish viscous polymer. The acid value of the polymer was 92 and the addition degree of maleic anhydride was 8.1%.

The reaction product was half esterified by the same method as in Example 1. The acid value of the polymer after half esterification was 43 and the esterification degree was about 50%. The reaction product was neutralized with 0.7 equivalent of diethyl amine.

A coating material was prepared in the same combination and content of the pigments as in Example 12. The pH value of the diluted coating material was 8.5. The throwing power was 85%. The edge covering was excellent. A film, having a thickness of about $25\mu$ was electrodeposited by applying 150 volts for 2 minutes, and the film was baked at 160° C. for 30 minutes. The properties of the film were closely similar to the results of Example 12.

EXAMPLE 21

The half esterified maleinized polybutadiene of Example 1 was heated at 120° C. for 3 hours with air bubbling prior to neutralization with triethyl amine.

Neutralized maleinized linseed oil was blended with the said product to form a coating material and tested in the same way as in Example 12.

The pH value of the diluted coating material was 8.3. The throwing power was 85%. A film having a thickness of about $25\mu$ was electrodeposited by applying 140 volts for 2 minutes, of which the properties were closely similar to the results in Example 12.

EXAMPLE 22

The half esterified, maleinized polybutadiene of Example 1 was heated at 120° C. for 3 hours with air bubbling. The resulting polybutadiene was neutralized, diluted with deionized water to obtain a coating material having 10% non-volatile matter. The pH value of the diluted coating material was 8.5. The throwing power thereof was 88%. The appearance of the film was good and the edge covering was excellent. No water-mark was caused. The pencil hardness was 3H. The result of Erichsen test was 5 mm. and the result of impact test was 50 cm. pass. Chemical properties such as alkali- and acid resistances, salt spray resistance, etc. were equal to those of Example 1.

COMPARATIVE EXAMPLE 1

A polymer having a number average molecular weight 3300, 90.0% 1,4-cis bonding 8.55% of 1,4-trans bonding, 1.45% of 1,2-bonding, a viscosity of 260 poises at 20° C. was maleinized using the same procedure as described in Example 2. The resulting polymer was brown and viscous. The acid value of the polymer was 158, and the addition degree of maleic anhydride was 13.8%. The acid value of the half esterified material with ethylene glycol monoethyl ether was 70 and the esterification degree was about 50%.

The product was neutralized in the same way as in Example 2, diluted with deionized water, and then electrodeposited on a zinc phosphate treated steel panel and brass panels. The resulting films were baked at 150° C. for 30 minutes. The surface of the films on a zinc phosphate treated steel panel was hard and had no tack, but the inside of the film was not sufficiently cured. The pencil hardness of a film having a thickness of $25\mu$ was 3B. Even though the baking temperature was raised, the hardness was not improved and the film could not be used in practice. The electrodeposited film on a brass panel was remarkably tacky even after baking, and was not cured.

A coating material prepared by blending the maleinized polybutadiene with maleinized linseed oil and dispersing pigments in the same manner as in Example 12, and another coating materials prepared by blending other water-soluble resins did not improve the curing properties of the inside of the films.

COMPARATIVE EXAMPLE 2

The treatments were carried out int he same manner as in Example 2 and in Example 12 by the use of a butadiene polymer having a number average molecular weight of 1710, 74.0% of 1,4-cis bonding, 25.8% of 1,4-trans bonding, 0.2% of 1,2-bonding and a viscosity of 56 poises at 20° C.

The results were closely similar to those in Comparative Example 1. The curing rate of the inside of the film was quite slow and therefore could not be used in practice.

COMPARATIVE EXAMPLE 3

In the procedure for producing the maleinized polybutadiene in Example 2, the dissolution was effected by the use of tert-butanol in place of ethylene glycol monoethyl ether, a half esterifying agent, thereafter neutralization was carried out, and further ethylene glycol monoethyl ether was employed instead of tert-butanol as a diluent. The acid value of the polymer in case of dissolution with tert-butanol was 148. 0.7 equivalent of diethyl amine was added to the composition.

To the composition, the neutralized material of the half esterified maleinized linseed oil prepared as in Example 12 was added and the resulting blended composition was diluted with deionized water to 10% non-volatile matter. The solution became remarkably hazy. When the solution was allowed to stand quietly, the solution was separated into two layers. Moreover, an electrodeposited coated film prepared by use of this coating material was opaque. This shows that the compatibility of the said two substances was poor. In case of a coating material in which the pigments shown in Example 12 were not dispersed, the coating material was neither remarkably hazy, nor separated into two layers. Moreover, the baked electrodeposited film was transparent. It was found that half esterification of maleinized polybutadiene greatly affected the compatibility.

FIG. 3 is an infrared absorption spectrum of the product prepared by dissolving maleinized polybutadiene with tert-butanol instead of effecting half-esterification of maleinized polybutadiene with ethylene glycol monoethyl ether, adding water thereto and heating at 95° C. for 4 hours. Absorption due to the acid anhydride ring at 1790 cm.$^{-1}$ disappeared and a strong absorption showing the formation of a carboxyl group at 1700 cm.$^{-1}$ appeared. On the other hand, absorption of the ester at 1720 cm.$^{-1}$ was not recognized at all. Thus it is apparent that a half ester is not formed.

In the case of a coating material prepared by using the maleinized polybutadiene formed in Comparative Example 3 and dispersing pigments in the same manner as in Example 7, a film having a thickness of 20µ or more could not be prepared unless a voltage of 200 volts or higher was applied. Film having a thickness of about 27µ was obtained at a rupture voltage of 250 volts. A thick film could not be electrodeposited, compared with the above-mentioned examples. Moreover, the film which was electrodeposited by applying normal voltage had remarkably poor smoothness, low gloss and was easily water-marked. The loss of adhesion from scratch in salt spray test was 8 mm., which was inferior to the loss in Example 12.

COMPARATIVE EXAMPLE 4

Figure 4:
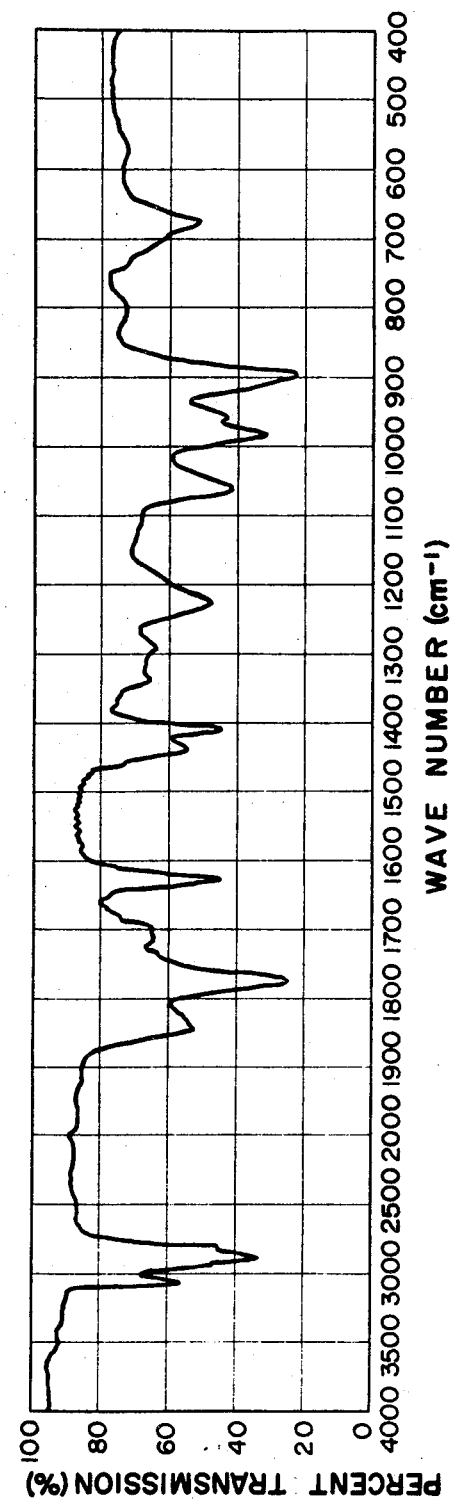

The maleinized polybutadiene of Example 2 was dissolved in ethylene glycol monoethyl ether at a room temperature. The acid value of the polymer prior to its dissolution was 148, but the acid value of the polymer after dissolution was 143. The esterification degree was about 4.5%. The infrared absorption spectrum of the polymer is shown in FIG. 4. That is to say, absorption due to the acid anhydride ring at 1790 cm.$^{-1}$ scarcely disappeared and the absorptions representing ester and carboxyl groups at 1720 cm.$^{-1}$ and 1700 cm.$^{-1}$ were quite weak.

Thus the prepared product was neutralized and treated in the same manner as in Example 2 and Example 12. The results of these tests were closely similar to those in Comparative Example 3, but remarkably inferior to those in Example 2 and Example 12.

From the results, the reasons why a higher esterification degree than that of the maleinized polybutadiene is required in the present invention are evident.

COMPARATIVE EXAMPLE 5

A coating material was prepared by employing only the neutralized material of the half esterified maleinized linseed oil prepared in Example 12 (without using maleinized polybutadiene blend) and tested by the same method as in Example 12.

The pH value of the diluted coating material was 8.0. The throwing power was 45%. A film having a thickness of 25µ was electrodeposited by applying 90 volts for 2 minutes and baked at 160° C. for 30 minutes. The appearance of the film was good, and the pencil hardness was B–HB. The result of Erichsen test was 8 mm. and the result of impact test was 50 cm. However, in an alkali resistance test the film was dissolved in 0.5 hour. Moreover, the results of salt spray test for 240 hours were inferior in comparison with those in said examples; i.e. rust creep from scratch being 2 mm.; the loss of adhesion from scratch being 4 mm. Moreover, the electrodeposited film was easily water-marked, and the film had low luster. When an alkyd-melamine enamel was topcoated on the electrodeposited film, the finished coating was rough and had a gloss value of 90 or less.

What we claim is:

1. A method for preparing an electrophoretic coating composition, which comprises heat-treating at least one butadiene polymer having a number average molecular weight of 500–700 and containing 70% or more 1,2-bonding at a temperature of 80–160° C. with bubbling air or oxygen through said polymer, adding to the resulting material maleic anhydride in an amount of 5–20 weight percent, and esterifying the thus obtained adduct with an esterifying agent having at least one primary or secondary alcoholic hydroxyl group in its molecule to an esterification degree of 10–50%.

2. A method as claimed in claim 1 comprising adding to the esterified polybutadiene and maleic anhydride 5 to 95% by weight of at least one water-soluble or water-dispersible resin compatible with said esterified polybutadiene.

3. A method for producing a water-soluble polybutadiene, which comprises adding maleic anhydride to at least one butadiene polymer having a number average molecular weight of 500–7000 and containing 70% or more 1,2-bonding, in an amount of 5 to 20 weight percent, esterifying the resulting adduct with an esterifying agent having at least one primary or secondary alcoholic hydroxy group in its molecule to an esterification degree of 10–50%, and thereafter heat-treating the resulting esterified product at a temperature of 80–160° C. with bubbling air or oxygen through said esterified product.

4. A method as claimed in claim 3 comprising adding to the esterified polybutadiene and maleic anhydride 5 to 95% by weight of at least one water-soluble or water-dispersible resin compatible with said esterified polybutadiene.

5. A method as claimed in claim 4 comprising adding to the esterified product 5–30% by weight of at least one water-soluble or water-dispersible resin compatible with said esterified product.

6. A method for producing an electrophoretic coating composition, which comprises adding at least one butadiene polymer having a number average molecular weight of 500–7000 and containing 70% or more 1,2-bonding to maleic anhydride to form an addition product, adding 5–95% by weight of an adduct of drying oils and ethylenically, $\alpha,\beta$-unsaturated dibasic acids to said addition product at a temperature of 70–130° C. in a nitrogen atmosphere, and esterifying the resulting mixture with an esterifying agent having at least one primary or secondary alcoholic hydroxyl group in its molecule to an esterification degree of 10–50%.

References Cited

UNITED STATES PATENTS

| | | | |
|---|---|---|---|
| 2,933,468 | 4/1960 | Aldridge et al. | 260—78.4 X |
| 3,518,213 | 6/1970 | Miyoshi et al. | 260—22 |

DONALD E. CZAJA, Primary Examiner

D. J. BARRACK, Assistant Examiner

U.S. Cl. X.R.

106—252, 265, 267, 285, 287; 204—181; 260—22 CQ, 23.7 A, 29.7 NR, 29.7 H, 78.4 D, 887

UNITED STATES PATENT OFFICE
CERTIFICATE OF CORRECTION

Patent No. 3,689,446          Dated September 5, 1972

Inventor(s) Akio Furuya, et. al.

It is certified that error appears in the above-identified patent and that said Letters Patent are hereby corrected as shown below:

In the heading, after line 11, insert the following:

-- Japan          December 10, 1968     90,450/68
   Japan          December 10, 1968     90,451/68
   Japan          December 11, 1968     90,829/68
   Japan          November  4, 1969     88,235/69 -- .

Signed and sealed this 2nd day of January 1973.

(SEAL)
Attest:

EDWARD M. FLETCHER, JR.                ROBERT GOTTSCHALK
Attesting Officer                      Commissioner of Patents